United States Patent Office 2,764,612
Patented Sept. 25, 1956

2,764,612
PROCESS FOR PREPARING SALTS OF GLUTAMIC ACID

Samuel H. Weidman, Los Gatos, Calif., assignor to International Minerals & Chemical Corporation, a corporation of New York No Drawing. Application May 29, 1953,
Serial No. 358,565

9 Claims. (Cl. 260—534)

The instant invention relates to processes for the production of salts of glutamic acid. More particularly, it relates to calcium salts of glutamic acid and to processes for their production.

Monocalcium diglutamate is the monobasic calcium salt of glutamic acid. When aqueous glutamic acid and lime are combined to produce a solution containing monocalcium diglutamate, the solution can be saturated, for example, by evaporation to produce a stable supersaturated solution. This solution is so stable that it can be concentrated to almost any degree, and no spontaneous crystallization of monocalcium diglutamate occurs. Such solutions, when evaporated in an open vessel at about atmospheric temperature, set to a hard glass-like material. Crystals of monocalcium diglutamate are not obtained. Attempts to crystallize monocalcium diglutamate from less concentrated solutions by allowing the solution to stand for extended periods of time result in very small yields of crystals. Failure to obtain satisfactory crysallization of monocalcium diglutamate has led to the spray drying of concentrated solutions of the salt which produces particles from which water is removed by dehydration.

It is an object of the instant invention to provide an improved method for the crystallization of monocalcium diglutamate.

It is a further object of the instant invention to provide a method for producing crystalline monocalcium diglutamate from its aqueous solutions in satisfactory yields.

It is a further object of the instant invention to provide a commercially feasible method for the comparatively rapid crystallization of monocalcium diglutamate.

It is a further object of the instant invention to provide a process for the preparation of seed crystals for the crystallization of monocalcium diglutamate.

These and other objects of the instant invention will become more apparent upon a fuller understanding of the instant invention as hereinafter set forth.

It has been discovered that monocalcium diglutamate crystals are produced by maintaining a solution which is at least saturated with respect to monocalcium diglutamate at an elevated temperature and while agitating the soluion it is seeded wih monocalcium diglutamafe prepared either in a previous crystallization or prepared as hereinafter described. When the monocalcium diglutamate solution is maintained at an elevated temperature while seeding, a good yield of monocalcium diglutamate crystals are obtained upon subsequent crystallization. Temperatures between about 60° C. and about the boiling point of the solution, preferably temperatures between about 75° C. and about 85° C. are employed for seeding. If the solution is seeded at about atmospheric temperature, crystallization is slow, and yields are very poor unless at least several weeks crystallization period is employed.

In one embodiment of the instant invention about the moles of glutamic acid in aqueous solution are reacted with a basic inorganic oxygen-containing compound of calcium, for example, about one mole of calcium hydroxide, calcium carbonate, or calcium oxide to produce a monocalcium diglutamate solution. Insoluble impurities are then separated from the solution, for example by filtration. The resulting solution is concentrated, for example, by evaporation to between about 50% and about 70% monocalcium diglutamate preferably about 60% monocalcium diglutamate. The concentrated solution is heated to and maintained at a temperature at which the solution is at least saturated or preferably supersaturated with respect to monocalcium diglutamate, for example, between about 75° C. and about 90° C. While agitating the hot solution monocalcium diglutamate seed are added. Monocalcium diglutamate is crystallized from the seeded solution upon cooling or further concentration of the solution and is separated from the solution, for example by filtration.

Monocalcium diglutamate seed are prepared either in a previous crystallization or by dehydration of material produced by spray drying a concentrated solution of monocalcium diglutamate. This monocalcium diglutamate solution can be prepared in the same manner as the solution from which monocalcium diglutamate is to be crystallized. However, the resulting seed particles will contain all of the soluble impurities present in the original solution, the chief impurity being magnesium which is introduced with the lime. In a preferred practice, a solution which is substantially free of magnesium is employed for the spray drying.

A solution of monocalcium diglutamate which is substantially free of magnesium is prepared by combining glutamic acid in water and sufficient calcium hydroxyglutamate or monocalcium monoglutamate trihydrate to obtain a pH of about 7.0. These compounds are prepared in such a manner as to be substantially free of magnesium. For example, about one mole of calcium oxide or calcium hydroxide is reacted with about one mole of glutamic acid in water. Insoluble solids, such as silica and hydroxide of magnesium are separated from the alkaline solution. A solution containing about one mole of glutamic acid is added to the resulting solution to produce a substantially magnesium-free neutral solution of monocalcium diglutamate. This solution is spray dried in any conventional equipment for such purpose. Depending upon the type of conventional equipment employed, for example the type of spray nozzles, the solution is concentrated or diluted prior to the spray drying. The resulting monocalcium diglutamate solution is then spray dried at any convenient temperature, for example, between about 100° C. and about 105° C. The spray dried calcium diglutamate, after being dried to an anhydrous condition, is used for seeding monocalcium diglutamate solutions to obtain crystalline monocalcium diglutamate.

In a specific embodiment of the invention, the monocalcium diglutamate solution is prepared by admixing about one mole of lime with an aqueous slurry containing about two moles of glutamic acid in about one liter of water. The resulting solution has a pH of between about 6.7 and about 7.2, preferably about 7.0. If desired, decolorizing carbon and filtering aid are added to the solution which is then heated at a temperature between about 40° C. and about 70° C., preferably between about 50° C. and about 60° C. for between about one-half hour and about one and one-half hours. Insoluble material is separated from the resulting solution, for example by filtration, at a temperature between about 50° C. and about 60° C., and filter cake is washed with water. The filtrate containing monocalcium diglutamate is concentrated in any convenient manner to produce a solution having a concentration between about 50% and about 70% monocalcium diglutamate, preferably about 60%. Evaporation under vacuum is preferably employed. This solution is heated to between about 80° C. and about 90° C., preferably about 85° C. at which temperature it is supersaturated and while the solution is being agitated at the elevated temperature, it is seeded with solid phase monocalcium diglutamate. Agitation is continued for a few minutes while monocalcium diglutamate crystallizes from the solution. The solution is then cooled and/or concentrated and the crystals which form are separated, preferably with a centrifuge and are washed and dried.

In another specific embodiment monocalcium monoglutamate trihydrate, from which seed are obtained, is prepared by slurrying about 99% purity glutamic acid in water and adding calcium oxide or calcium hydroxide to the slurry until the resulting slurry has a pH between about 10.6 and about 10.8. The quantities of the reactants and the water employed is sufficient to produce a slurry containing between about 10% and about 15% monocalcium monoglutamate trihydrate. The trihydrate salt is preferably prepared by heating the slurry at between about 50° C. and about 60° C. When a small amount of the salt is prepared, higher temperatures can be used if the heating period is short and the necessary operations can be carried out rapidly. For example, the slurry is heated to its boiling point, and insoluble material which is principally magnesium hydroxide and silica is separated immediately. The solution from which the insoluble material have been separated is immediately cooled with agitation and stored for at least about one hour at a temperature between about 20° C. and about 30° C. Monocalcium monoglutamate trihydrate is separated from the resulting slurry and is dried at about 70° C.

In order to prepare the monocalcium monoglutamate trihydrate on a larger scale glutamic acid is slurried in water and calcium hydroxide or calcium oxide is added until the pH of the resulting slurry is between about 10.6 and about 10.8 at between about 50° C. and about 60° C. The quantity of glutamic acid and water is such that the resulting solution contains about 3.8% monocalcium monoglutamate trihydrate. Insoluble material is separated from the solution, for example, by filtration and the filtrate is evaporated, for example, at a temperature of about 50° C. to produce a slurry containing between about 10% and about 15%, preferably about 12% monocalcium monoglutamate trihydrate. The resulting slurry is cooled to between about 20° C. and about 30° C., and the trihydrate salt is separated from the cooled slurry.

Calcium hydroxyglutamate, from which seed are prepared, is formed by the reaction of about one mole of glutamic acid with about one mole of either calcium oxide or calcium hydroxide in aqueous solution. This salt is prepared in the same manner as is the monocalcium monoglutamate trihydrate with the exception that the filtrate obtained after removal of insoluble solids is concentrated at a temperature between about 80° C. and about 90° C., rather than at about 50° C. The slurry which contains between about 10% and about 15%, preferably about 12% of the calcium hydroxyglutamate is cooled, and the crystals are separated.

In preparing the seed glutamic acid is admixed with a slurry of either calcium hydroxyglutamate or the trihydrate salt until the pH of the resulting solution reaches about 7. The quantities of reactants and water preferably are sufficient to produce about a 30% solution of monocalcium diglutamate, although lower concentrations in the solution are satisfactory. The resulting solution is then concentrated or diluted to produce a solution which is suitable for spray drying. The spray dried monocalcium diglutamate is dried to an anhydrous condition, and the resulting particles which are substantially free of magnesium can be used as seed in the production of monocalcium diglutamate crystals as above described. Once crystals of monocalcium diglutamate have been obtained, they can be used in subsequent crystallizations as seed crystals and if desired, can replace the use of dehydrated spray dried particles as seed.

As specific examples of the process, the following serve merely as illustrations, and it is not intended that the scope of the invention be limited thereto.

*Example I*

About 530 grams of 99% glutamic acid was admixed with about 1500 milliliters of water. Powdered lime was added to the resulting slurry until the mixture had a pH of about 7. Between about 100 grams and about 110 grams of calcium oxide or between about 134 grams and about 147 grams of calcium hydroxide were added to the slurry depending upon the purity of the lime. About 15 grams of decolorizing carbon and about 15 grams of filter aid were added to the slurry which was then heated to between about 50° C. and about 60° C. and stirred at this temperature for about one-half hour. Insoluble material was separated by filtration, and the filtrate was evaporated to a weight of about 1000 grams. The concentrated solution was heated to about 85° C. and while the solution was stirred it was seeded with about 6 grams of monocalcium diglutamate prepared as shown in Example II. Stirring of the hot solution was continued for about fifteen minutes, then it was allowed to cool to about 35° C. and crystallize overnight. Monocalcium diglutamate crystals were separated from the solution by centrifuging and were washed and dried. About 210 grams of monocalcium diglutamate crystals were obtained, which is a yield of about 35%, based on the glutamic acid employed.

*Example II*

About 80 grams of 99% glutamic acid was slurried with about 850 milliliters of water, and the slurry was adjusted to a pH between about 10.7 and about 10.8 with powdered calcium hydroxide. The resulting slurry was rapidly heated to its boiling point and was immediately filtered to separate the magnesium hydroxide and the silica which were introduced with the lime. While stirring, the filtrate was cooled and stored at a temperature between about 25° C. and about 30° C. for between about one hour and about two hours. Monocalcium monoglutamate trihydrate was separated by filtration.

About 120 grams (0.5 mole) of the trihydrate was admixed with about 74 grams (0.5 mole) glutamic acid slurried in 500 grams of water to produce a monocalcium diglutamate solution. The resulting solution was spray dried. The spray dried material was dried to the anhydrous condition in an oven and then was used as seed for producing crystals of monocalcium diglutamate.

Having thus fully described and illustrated the character of the invention, what is desired to be secured and claimed by Letters Patent is:

1. A process for preparing crystals of monocalcium diglutamate which comprises preparing a solution containing monocalcium diglutamate, heating said solution to a temperature between about 60° C. and about the boiling point at which temperature the solution is at least saturated, agitating the hot solution at a temperature between about 60° C. and the boiling point of the solution while seeding with solid phase monocalcium diglutamate, crystallizing monocalcium diglutamate from the seeded solution, and separating the monocalcium diglutamate crystals.

2. A process for preparing crystals of monocalcium diglutamate which comprises admixing glutamic acid and water with a basic inorganic oxygen containing compound of calcium to produce monocalcium diglutamate in solution, heating the resulting monocalcium diglutamate solution to a temperature between about 60° C. and about the boiling point at which temperature the solution at a temperature between about 60° C. and the boiling point of the solution is at least saturated, agitating the hot solution while seeding with monocalcium diglutamate, crystallizing monocalcium diglutamate from the seeded solution, and separating the monocalcium diglutamate crystals.

3. A process for preparing crystals of monocalcium diglutamate which comprises admixing glutamic acid and water with a basic inorganic oxygen containing compound of calcium to produce monocalcium diglutamate in solution, heating the monocalcium diglutamate solution to a temperature between about 60° C. and about the boiling point at which temperature the solution is supersaturated, agitating the hot solution at a temperature between about 60° C. and the boiling point of the solution while seeding with monocalcium diglutamate, crystallizing monocalcium diglutamate from the seeded solution, and separating the monocalcium diglutamate crystals.

4. A process for preparing crystals of monocalcium diglutamate which comprises preparing a solution of monocalcium diglutamate, spray drying said solution, drying the spray dried material to anhydrous condition, adding the resulting dehydrated particles to a solution which is at least saturated with respect to monocalcium diglutamate while agitating said solution at a temperature between about 60° C. and about its boiling point, crystallizing monocalcium diglutamate from the seeded solution, and separating the monocalcium diglutamate crystals.

5. A process for preparing crystals of monocalcium diglutamate which comprises preparing an aqueous solution containing between about 50% and about 70% monocalcium diglutamate, heating said solution to a temperature between about 80° C. and about 90° C., agitating the hot solution while seeding with solid phase monocalcium diglutamate, crystallizing monocalcium diglutamate from the seeded solution, and separating the monocalcium diglutamate crystals.

6. A process for preparing crystals of monocalcium diglutamate which comprises admixing glutamic acid and water with a basic inorganic oxygen containing compound of calcium to produce monocalcium diglutamate in solution, spray drying the monocalcium diglutamate solution, drying the spray dried material to anhydrous condition, adding the resulting particles to a supersaturated monocalcium diglutamate solution while agitating said solution at a temperature between about 80° C. and about 90° C., crystallizing monocalcium diglutamate from the seeded solution, and separating the monocalcium diglutamate crystals.

7. A process for preparing crystals of monocalcium diglutamate which comprises reacting glutamic acid in water with a calcium salt of glutamic acid selected from the group consisting of calcium hydroxyglutamate and monocalcium monoglutamate trihydrate, spray drying the resulting solution, drying the spray dried material to anhydrous condition, adding the resulting particles to a solution which is at least saturated with respect to monocalcium diglutamate while agitating said solution at a temperature between about 60° C. and about its boiling point, crystallizing monocalcium diglutamate from the seeded solution, and separating the monocalcium diglutamate crystals.

8. A process for preparing crystals of monocalcium diglutamate which comprises reacting about one mole of glutamic acid in water with about one mole of a calcium salt of glutamic acid selected from the group consisting of calcium hydroxyglutamate and monocalcium monoglutamate trihydrate, spray drying the resulting solution, drying the spray dried material to anhydrous condition, adding the resulting particles to a solution which is at least saturated with resepct to monocalcium diglutamate while agitating said solution at a temperature between about 60° C. and about its boiling point, crystallizing monocalcium diglutamate from the seeded solution, and separating the monocalcium diglutamate crystals.

9. A process for preparing crystals of monocalcium diglutamate which comprises reacting about one mole of glutamic acid in water with about one mole of a calcium salt of glutamic acid selected from the group consisting of calcium hydroxyglutamate and monocalcium monoglutamate trihydrate, spray drying the resulting solution, drying the spray dried material to anhydrous condition, adding the resulting particles to a solution which is supersaturated with respect to monocalcium diglutamate while agitating said solution at a temperature between about 80° C. and about 90° C., crystallizing monocalcium diglutamate from the supersaturated solution, and separating the monocalcium diglutamate crystals.

No references cited.